United States Patent
Barron et al.

(10) Patent No.: US 7,502,826 B2
(45) Date of Patent: Mar. 10, 2009

(54) ATOMIC OPERATIONS

(75) Inventors: Dwight L Barron, Houston, TX (US); Jeffrey R. Hilland, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1064 days.

(21) Appl. No.: 10/401,233

(22) Filed: Mar. 27, 2003

(65) Prior Publication Data

US 2004/0193734 A1 Sep. 30, 2004

(51) Int. Cl.
*G06F 15/16* (2006.01)

(52) U.S. Cl. ............... 709/205; 709/223; 709/250; 709/238; 709/225

(58) Field of Classification Search ........... 709/250, 709/223, 238, 225, 205
See application file for complete search history.

(56) References Cited

U.S. PATENT DOCUMENTS

| | | | |
|---|---|---|---|
| 5,325,532 A | 6/1994 | Crosswy et al. | |
| 5,586,274 A * | 12/1996 | Bryg et al. | 710/108 |
| 5,613,071 A * | 3/1997 | Rankin et al. | 707/10 |
| 5,675,807 A | 10/1997 | Iswandhi et al. | |
| 5,737,604 A | 4/1998 | Miller et al. | |
| 5,751,932 A | 5/1998 | Horst et al. | |
| 5,809,285 A | 9/1998 | Hilland | |
| 5,815,707 A | 9/1998 | Krause et al. | |
| 5,822,571 A | 10/1998 | Goodrum et al. | |
| 5,870,568 A | 2/1999 | Culley et al. | |
| 5,872,941 A | 2/1999 | Goodrum et al. | |
| 5,914,953 A | 6/1999 | Krause et al. | |
| 5,948,111 A | 9/1999 | Taylor et al. | |
| 5,964,835 A | 10/1999 | Fowler et al. | |
| 5,983,269 A | 11/1999 | Mattson et al. | |
| 6,018,620 A | 1/2000 | Culley et al. | |
| 6,047,323 A | 4/2000 | Krause | |
| 6,070,198 A | 5/2000 | Krause et al. | |
| 6,070,253 A | 5/2000 | Tavallaei et al. | |
| 6,157,967 A | 12/2000 | Horst et al. | |
| 6,163,834 A | 12/2000 | Garcia et al. | |
| 6,233,702 B1 | 5/2001 | Horst et al. | |
| 6,457,152 B1 * | 9/2002 | Paley et al. | 714/738 |
| 6,484,208 B1 | 11/2002 | Hilland | |
| 6,493,343 B1 | 12/2002 | Garcia et al. | |
| 6,496,940 B1 | 12/2002 | Horst et al. | |
| 6,502,203 B2 | 12/2002 | Barron et al. | |
| 6,721,806 B2 * | 4/2004 | Boyd et al. | 719/312 |
| 6,917,987 B2 * | 7/2005 | Parthasarathy et al. | 709/249 |
| 7,076,629 B2 * | 7/2006 | Bonola | 711/170 |
| 2002/0091841 A1 * | 7/2002 | Beukema et al. | 709/229 |
| 2002/0152327 A1 * | 10/2002 | Kagan et al. | 709/250 |
| 2002/0184446 A1 * | 12/2002 | Kagan et al. | 711/130 |
| 2004/0190533 A1 * | 9/2004 | Modi et al. | 370/400 |
| 2006/0129699 A1 * | 6/2006 | Kagan et al. | 709/250 |

* cited by examiner

*Primary Examiner*—Walter L Lindsay, Jr.
*Assistant Examiner*—Abdulfattah Mustapha

(57) ABSTRACT

The disclosed embodiments relate to a communication device for use in a node of a system having a plurality of nodes. Each of the plurality of nodes may include network interface controllers ("NICs") and each of the NICs may have an atomic operation logic device therewith. The atomic operation logic may receive from a requester a packet that contains a request to perform an atomic operation. Then the atomic operation logic may determine that the atomic operation is being requested from the information within the packet. The atomic operation logic may also respond to the requester to indicate whether the atomic operation has been performed.

22 Claims, 4 Drawing Sheets

300

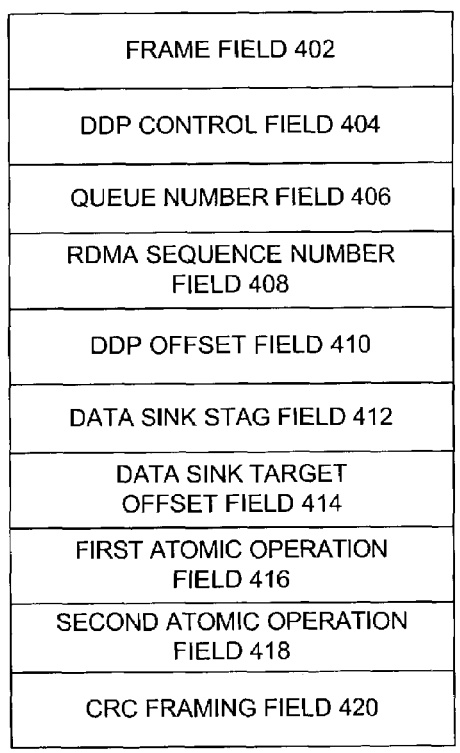
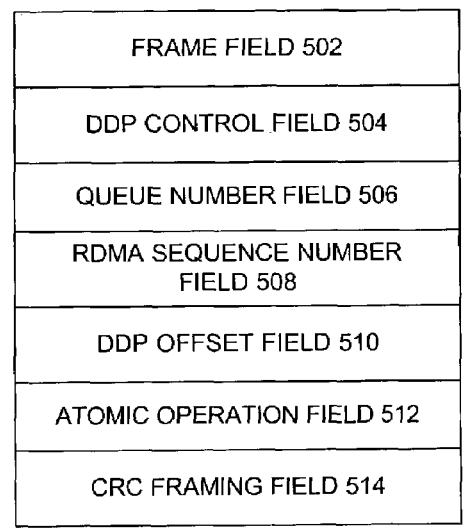
FIG. 3
FIG. 4

ATOMIC OPERATIONS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. The information may be transferred more efficiently by using methods such as remote direct memory access ("RDMA") or direct data placement ("DDP"). In systems that employ RDMA or DDP, it may be desirable to perform atomic operations to conserve system resources and ensure that data integrity is maintained.

If a system central processing unit ("CPU") is used to perform atomic operations, resources of that CPU are consumed and the CPU is able to do less overall work. As a result, the system may perform at degraded levels.

BRIEF DESCRIPTION OF THE DRAWINGS

The foregoing and other advantages of the invention may become apparent upon reading the following detailed description and upon reference to the drawings in which:

FIG. 3 is a block a block diagram illustrating a simplified packet format in accordance with embodiments of the present invention;

FIG. 4 is a block a block diagram illustrating an alternative simplified packet format in accordance with embodiments of the present invention.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve ability of computer systems to remotely access the memory of other computer systems. One such specification under development is the RDMA Consortium Protocols Verb specification, which is hereby incorporated by reference. The verbs defined by this specification may correspond to commands or actions that may form a command interface for data transfers between memories in computer systems, including the formation and management of queue pairs, memory windows, protection domains and the like.

RDMA may refer to the ability of one computer to directly place information in the memory space of another computer, while minimizing demands on the central processing unit ("CPU") and memory bus. In an RDMA system, an RDMA layer may interoperate over any physical layer in a Local Area Network ("LAN"), Server Area Network ("SAN"), Metropolitan Area Network ("MAN"), or Wide Area Network ("WAN").

Figure 1:
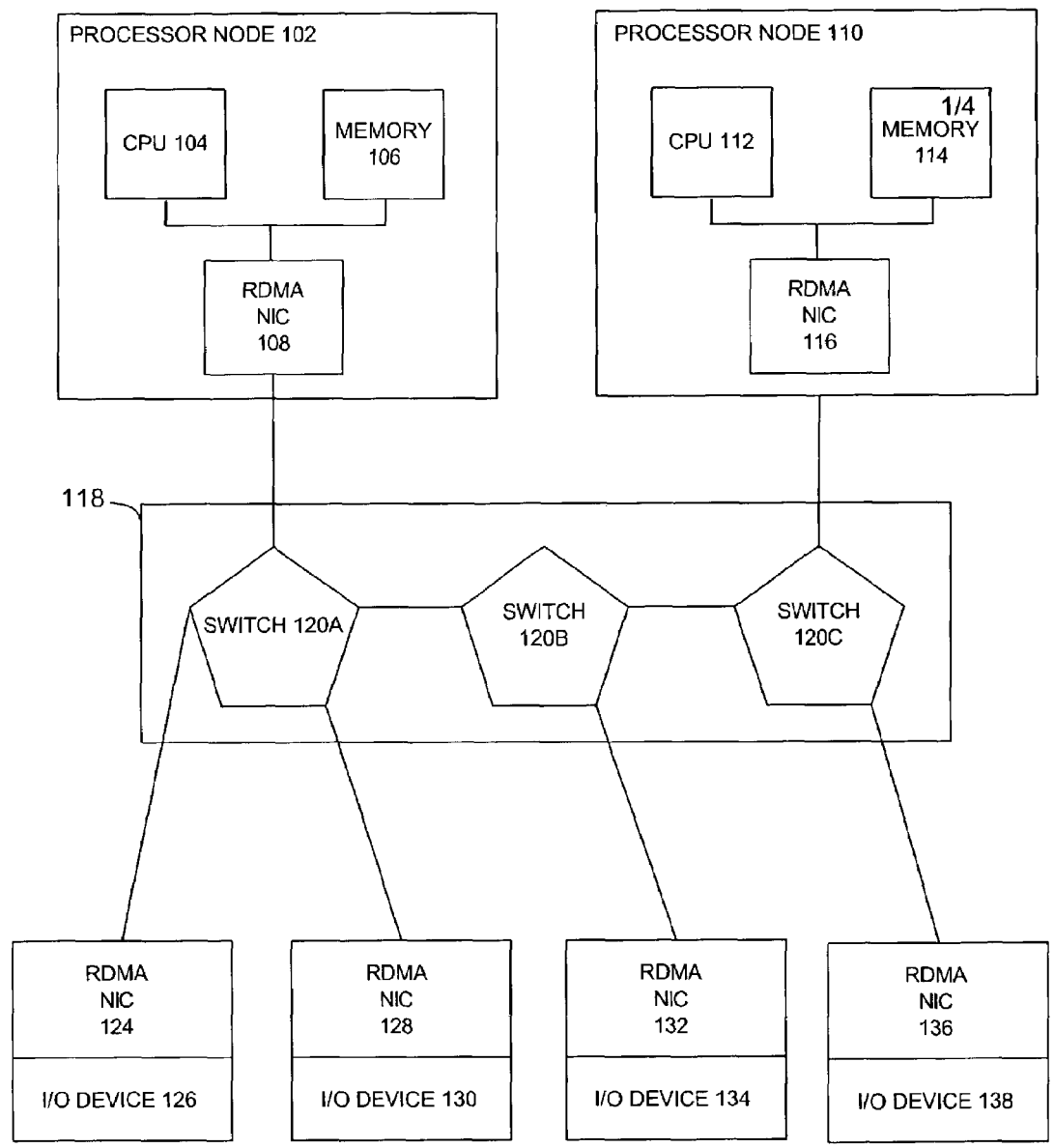
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and may comprise a first processor node 102 and a second processor node 110, which may be connected to a plurality of I/O devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 may be connected to the memory 106 and the RNIC 108 over an internal bus or connection. The memory 106 may be utilized to store information for use by the CPU 104, the RNIC 108 or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers and the like. In FIG. 1, the switch network 118comprises switches 120A-120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given equal priority and the same access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information between the various devices shown in FIG. 1 for the purpose of facilitating the performance of atomic operations in an open network environment is explained with reference to FIG. 2.

Figure 2:
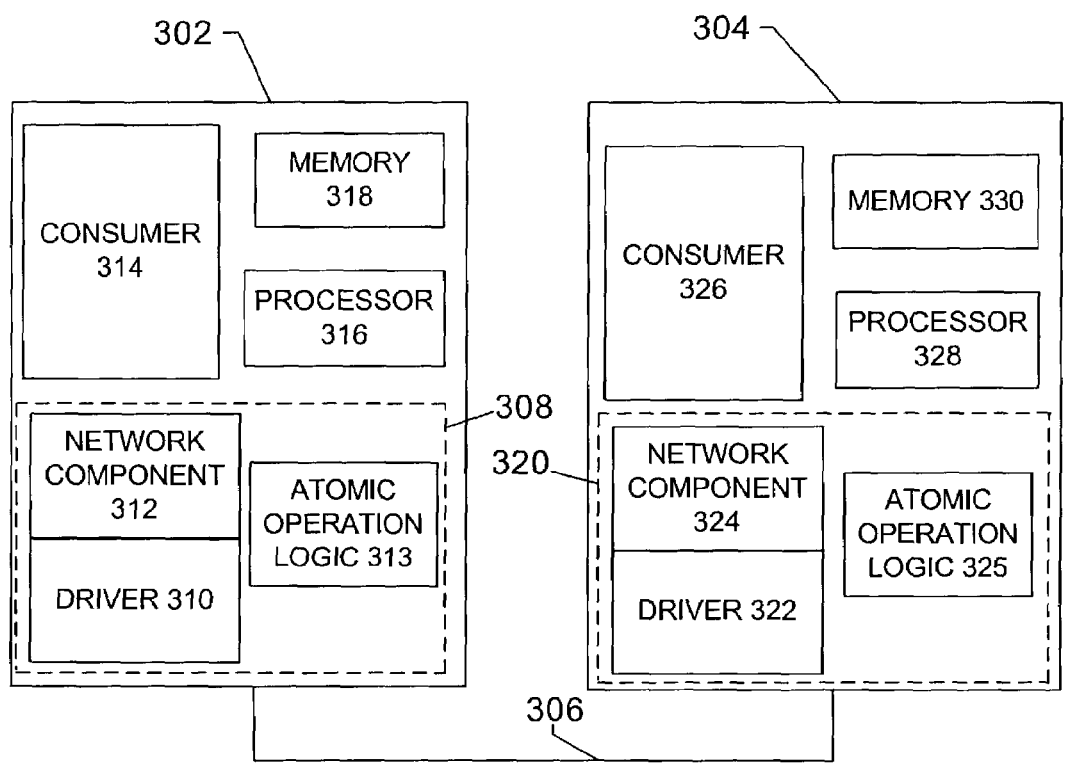
FIG. 2 is a block diagram illustrating internal components of a system in accordance with embodiments of the present invention.

FIG. 2 is a block diagram illustrating internal components of a system in accordance with embodiments of the present invention. In this diagram 300, a first node 302 and a second node 304 may each correspond to one of the processor nodes or I/O devices shown in FIG. 1. The nodes 302 and 304 are connected via a network 306, which may correspond to the switch network 118 of FIG. 1. An RNIC 308 (shown in dashed lines) is associated with the node 302 and an RNIC 320 (shown in dashed lines) is associated with the node 304.

A consumer 314 may be associated with the node 302 and a consumer 326 may be associated with the node 304 to facilitate the exchange of data packets therebetween. The consumers may correspond to software processes or other processes that manage protocol layers in association with the RNICs 308 or 320. The consumer 314 may represent a process that is executing on a processor 316 and accessing a memory 318. The consumer 326 may represent a process that is executing on a processor 328 and accessing a memory 330.

The RNICs 308 and 320, which may also be DDP-enabled, may be able to respond to operation codes and/or wire formats of atomic operations. A transmission control protocol/internet protocol ("TCP/IP") offload engine may be implemented in the RNICs 308 and 320 to facilitate the processing of requests to perform atomic operations. The TCP/IP offload engine, which may be referred to by the acronym "TOE," may offload the TCP/IP processing from the host CPUs 316 and 328. The RNIC 308 may comprise a driver 310, network component 312 and an atomic operation logic component 313. The RNIC 320 may comprise a driver 322, network component 324 and an atomic operation logic component 325.

The drivers 310 and 322 may operate in connection with the network components 312 and 324, respectively, to transmit and receive packets across the network 306. The network components 312 and 324 may provide standard methods for protocol addressing, sending and receiving datagrams, writing and reading on streams, and/or detecting disconnects for interfacing with an application-programming interface ("API"), for instance. The network component 312 or 324 may also provide connection-oriented service or port for a specific application to use in communicating with other nodes 302 or 304. Packet recognition engines may be built into the network components 312 and 324 to allow the RNICs 308 and 320 to parse incoming packets, such as DDP/RDMA packets and determine if a request for an atomic operation is contained within the packet.

The atomic operation logic components 313 or 325 may comprise a portion of the network components 312 or 324, or they may be implemented as separate components within their respective nodes. Hardware, software or some combination thereof may be employed to implement the atomic operation logic components 313 or 325. The atomic operation logic components 313 or 325 may receive a packet that contains a request to perform an atomic operation, may determine that the atomic operation is being requested and may respond to the requester to indicate whether the atomic operation is performed. The atomic operation logic 313 or 325 may perform the atomic operation without employing other resources external to the RNIC 308 or 320. In other words, the atomic operation may be performed independent of the operation of the processors 316 or 328.

Atomic operations may comprise a group of operations that may happen simultaneously or in sequence but without interruption for a specific task to be accomplished properly. For instance, atomic operations may be implemented in spin-locks inside of an operating system and/or monotonically incrementing sequence numbers. Atomic operation may include the examination of data, conditional or unconditional modification of data, placement of a new value into a data location, and/or returning a response on the result of the operation with previous or subsequent values of the data or the like. The organization of data packets to facilitate the performance of atomic operations in an open network environment is explained with reference to FIG. 3.

FIG. 3 is a block a block diagram illustrating a simplified packet format in accordance with embodiments of the present invention. In this diagram 400, a packet, such as an atomic request packet, may be divided into various fields or segments. For instance, the packet may include a frame field 402 that may include a frame length for the framing layer. A DDP control field 404 may be implemented to define the characteristics about the DDP protocol. The DDP control field 404 may be segmented into different subfields according to the bits set in each specific location.

For instance, with a DDP control field 404, the first bit may be a buffer model bit, which may specify if the buffer model is tagged or untagged. The second bit may be a notify bit that may be set if this is the last segment of the message. The third through the fifth bits may be used to indicate the DDP version that is being utilized or may be reserved for future use. The sixth and seventh bits may be reserved for future use in a later version, while the eighth bit through the sixteenth bit may be utilized by the upper layer protocols. The eighth and ninth bits may be reserved and set to zero. The tenth through the thirteenth bits may be used for RDMA operation commands, such as an atomic compare and swap requests and atomic increment requests. The atomic compare and swap request may be indicated by a bit pattern or "0100b" and the atomic increment request may be indicated by a bit pattern of "0101b." Also, the fourteenth through the sixteenth bits may be an RDMA version field.

In addition, various fields may correspond to information about the connection and the protocol. For instance, a queue number field 406 may be used to identify the value of the queue number, which may correspond to the connection established between different nodes, such as the nodes 302 and 304 of FIG. 2. An RDMA sequence field 408 may include the RDMA sequence number for the packet. The DDP offset field 410 may include the offset of the data payload in the packet.

Other fields within the packet may include information about and for use at the remote node. A data sink steering tag ("STag") field 412 may be a steering tag that identifies the destination buffer in which to place or retrieve the RDMA data, which may be a memory location, such as the memories 318 or 330 of FIG. 2. A data sink target offset field 414 may correspond to an offset in the destination buffer in which the data is to be retrieved or placed. A first atomic operand 416 and a second atomic operand 418 may contain information about specific operations to be performed at the remote node.

For instance, the atomic operands may be a Compare and Swap Atomic ("CASA") and/or an Add and Store Return ("AASR"). With the CASA operation, the first atomic operand 416 may be a value to be compared with a value in a memory location. The second atomic operand 418 may be a value to be exchanged if the data in that memory location is not equal to the data in the first atomic operand 416. With the AASR operation, the first atomic operand 416 may be a value to be added to a value in a memory location. Finally, a CRC framing field 420 may be included to verify that the message has not been corrupted.

As shown, the fields within the packet 400 may include various values to indicate or correspond to a specific command or operation. When a packet is received at a node, such as node 302 or 304 of FIG. 2, the node may parse the packet to determine if an atomic operation is requested by the packet. For instance, if the tenth through the thirteenth bits of the DDP control field 404 are set to a value, such as "100b" or 101b," then an atomic operation, such as compare and swap or atomic increment, may be indicated. By setting these bits within this field 404, the receiving node may perform the atomic operation without utilizing the processor. Another packet format that may be utilized for atomic operations is shown in FIG. 4.

FIG. 4 is a block a block diagram illustrating an alternative simplified packet format in accordance with embodiments of the present invention. In this diagram 500, a packet, such as an atomic response packet, may be divided into various fields or segments. For instance, the packet may include a frame field 502 that may include a frame length for the framing layer. A DDP control field 504 may be implemented to define the characteristics about the DDP protocol. The DDP control field 504 may be segmented into according to the bits set in each specific location.

For instance, with a DDP control field 504, the first bit may be a buffer model bit, which may specify if the buffer model is tagged or untagged. The second bit may be a notify bit that may be set if the packet is the last segment of the message. The third, fourth and fifth bits may be used to indicate the DDP version that is being utilized or may be reserved for future use. The sixth and seventh bits may be reserved for future use and the eighth bit through the sixteenth bit may be utilized by upper layer protocols. The eighth and ninth bits may be reserved and set to zero. The tenth through the thirteenth bits may be used for RDMA operation commands, such as an atomic response. The bits being set to a specific pattern, such as "111b", may indicate the atomic response. Also, the fourteenth through the sixteenth bits may be an RDMA version field.

In addition, various fields may correspond to information about the connection and the protocol. For instance, a queue number field 506 may be used to identify the value of the queue number, which may correspond to the connection established between different nodes. An RDMA sequence field 508 may include the RDMA sequence number for the packet. The DDP offset field 510 may include the offset of the data payload in the packet.

Other fields within the packet may include information about and for use at the remote node, which may be node 302 or 304 of FIG. 2. An atomic operand 512 may specify operations to be performed at the remote node or may indicate if the atomic operation was successful or failed. Finally, a CRC framing field 514 may be included to verify that the message has not been corrupted.

The fields within the packet 500 may include various values to indicate a specific command or operation. When the packet is received at a node, the node may parse the packet to determine if data about an atomic operation is contained within the packet. For instance, the packet may include an atomic operation if certain bits are set within the DDP control field 504. If the tenth through the thirteenth bits of the DDP control field 404 are set to a value, such as "111b," then an atomic operation, such as an atomic response, may be indicated. By setting these bits within this field 504, the receiving node may verify that a previously requested atomic operation has been completed without interfacing with the processor.

Figure 5:
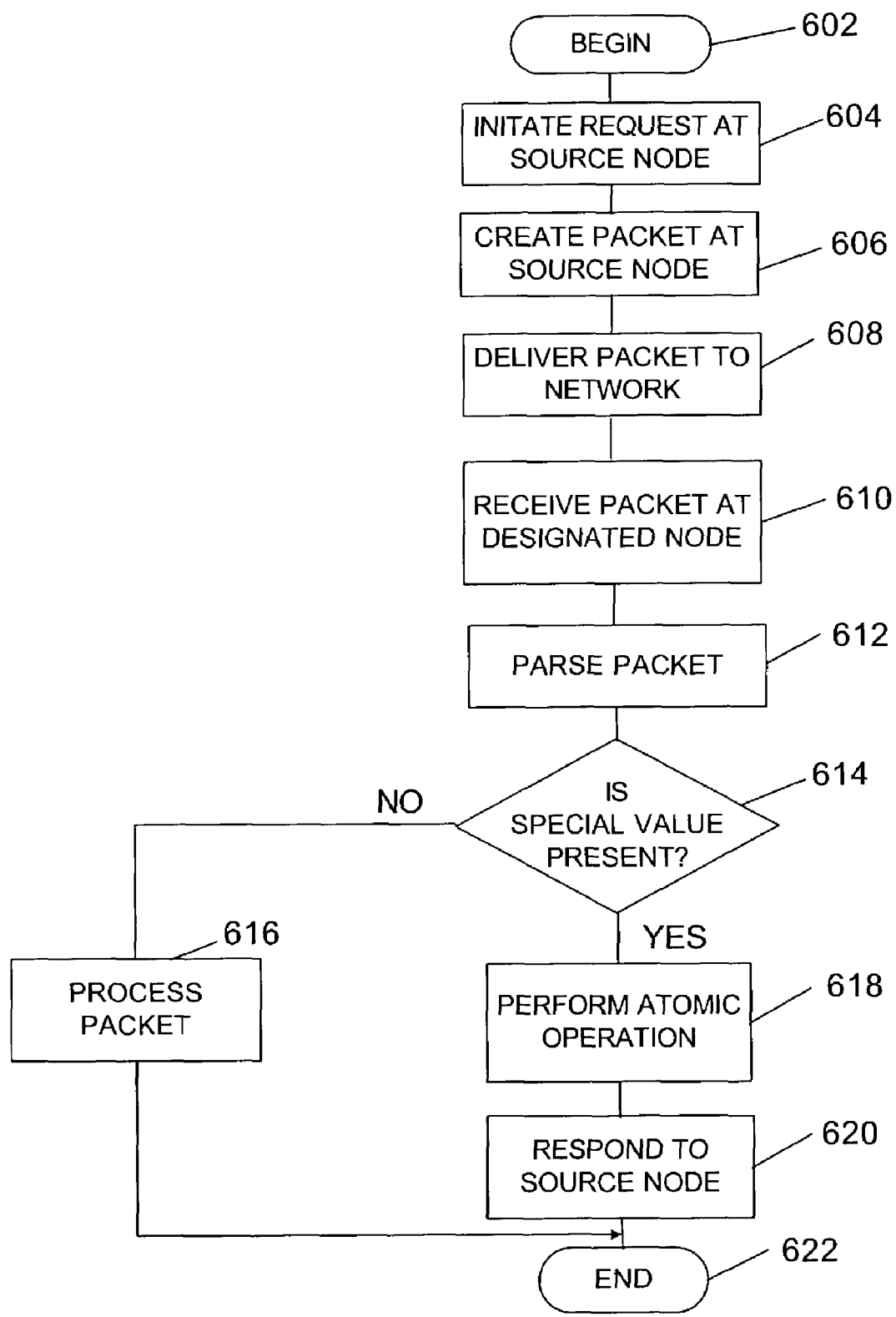
FIG. 5 is a process flow diagram that shows a process in accordance with embodiments of the present invention.

FIG. 5 is a process flow diagram that shows a process in accordance with embodiments of the present invention. The flow diagram is generally referred to by reference numeral 600. The process begins at block 602. At block 604, a request may be initiated by a source node for the exchange of a packet. The packet may be an RDMA request packet that is transmitted from a source node. At block 606, a packet may be created and may include the appropriate format and settings to request the performance of an atomic operation. The packet may be formatted as shown in FIG. 3. As shown in block 608, the packet may be delivered to a network from the source node, which may be an RDMA-enabled system.

After the packet has been delivered to the network, in block 610, the packet may be received at the designated node. The destination node may include an RMC a TOE-enabled NIC or the like. Upon receiving the packet, the destination node may ensure that no other operations are allowed to the memory location, which may be referred to as a LOCK operation. This locking of the memory location may be local to the RNIC or coherent within the cache system within the designated node. At block 612, the designated receiving node may parse the packet access the various fields within the packet. Then at block 614, the destination node may examine the packet to determine if the special value for an atomic operation is present. If the special value of the packet does not correspond to an atomic operation, then the destination node may further process the packet at block 616. The further processing of the packet may involve manipulating the packet with other components that may manage protocol layers.

However, if the special value corresponds to an atomic operation, then the destination node may perform the atomic operation at block 618. The performance of the operation may vary depending on the atomic operation that is indicated within the packet. For instance, if the atomic operation corresponds to the Atomic Compare and Swap operation, then the destination node may access the memory location indicated within the packet. The memory location value may be compared with the value within the packet, which may be the first atomic operand field 416 of FIG. 3. If the values match, then the destination node may exchange the memory location with other data within the packet, which may be the second atomic operand field 418 of FIG. 3. Alternatively, if the atomic operation corresponds to the Atomic Increment operation, then the destination node may access the memory location indicated within the packet. The destination node may then add the value in the packet, such as the first atomic operand field 416 of FIG. 3, to the value in the memory location.

After the operation has been performed, at block 620, the destination node may respond to the source node with a packet, such as packet 500 of FIG. 4. With the Atomic Compare and Swap operation, the destination node may respond to the source node, which may include original sequence number and the value within the packet. The sequence number may be the RDMA sequence field 408 of FIG. 3, while the value may be the first atomic operand field 416 of FIG. 3. If the value is the value originally transmitted, then the source node may be able to determine if the operation was completed successfully or failed. Also, with the Atomic Increment operation, the destination node may respond to the source node, which may include the original sequence number and the value within the packet. The sequence number may be the RDMA sequence field 408 of FIG. 3, while the value may be the first atomic operand field 416 of FIG. 3. After either block 616, or 620, the process may end, as shown at block 622.

While the invention may be susceptible to various modifications and alternative forms specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A network interface card ("NIC") comprising:
an atomic operation logic processing device to: receive from a requester a packet that contains a request to perform an atomic operation; determine that the atomic operation is being requested; and respond to the requester to indicate the atomic operation has been performed if the packet that contains the request to perform an atomic operation comprises a value indicating a response should be sent.

2. The NIC set forth in claim 1, wherein the atomic operation logic device is adapted to perform the atomic operation.

3. The NIC set forth in claim 1, wherein the atomic operation logic device is adapted to perform the atomic operation without employing a processor external to the NIC.

4. The NIC set forth in claim 1, wherein the packet is transmitted to the atomic operation logic device according to the internet protocol ("IP").

5. The NIC set forth in claim 1, wherein the packet is transmitted to the atomic operation logic device according to the direct data placement ("DDP") protocol.

6. The NIC set forth in claim 5, wherein the request to perform he atomic operation is contained in a DDP control field.

7. The NIC set forth in claim 1, wherein the atomic operation is a compare and swap atomic ("CASA") operation.

8. The NIC set forth in claim 1, wherein the atomic operation is an add and store return ("AASR") operation.

9. A computer network, comprising:
a plurality of computer systems;
at least one input/output device;
a switch network that connects the plurality of computer systems and the at least one input/output device for communication; and
wherein the plurality of computer systems and the at least one input/output device comprise a network interface controller ("NIC"), each NIC having an atomic operation logic device adapted to:
receive from a requester a packet that contains a request to perform an atomic operation;
determine that the atomic operation is being requested; and
respond to the requester to indicate the atomic operation has been performed if the packet that contains the request to perform an atomic operation comprises a value indicating a response should be sent.

10. The computer network set forth in claim 9, wherein the atomic operation logic device is adapted to perform the atomic operation.

11. The computer network set forth in claim 9, wherein the atomic operation logic device is adapted to perform the atomic operation without employing a processor external to the NIC.

12. The computer network set forth in claim 9, wherein the packet is transmitted to the atomic operation logic device according to the internet protocol ("IP").

13. The computer network set forth in claim 9, wherein the packet is transmitted to the atomic operation logic device according to the direct data placement ("DDP") protocol.

14. The computer network set forth in claim 13, wherein the request to perform the atomic operation is contained in a DDP control field.

15. The computer network set forth in claim 9, wherein the atomic operation is a compare and swap atomic ("CASA") operation.

16. The computer network set forth in claim 9, wherein the atomic operation is an add and store return ("AASR") operation.

17. A method of performing an atomic operation in a computer system, the method comprising the acts of: creating a packet that embodies a request for an atomic operation; transmitting the packet to a receiver; determining that the atomic operation is being requested; and responding to the requester to indicate the atomic operation is performed if the packet that embodies the request to perform an atomic operation comprises a value indicating a response should be sent.

18. The method set forth in claim 17, comprising performing the atomic operation.

19. The method set forth in claim 17, comprising performing the atomic operation without employing a processor external to a network interface card ("NIC").

20. The method set forth in claim 17, comprising receiving the packet over an internet protocol ("IP") connection.

21. The method set forth in claim 17, comprising receiving the packet over a direct data placement ("DDP") protocol connection.

22. The method set forth in claim 21, comprising disposing the request to perform the atomic operation in a DDP control field.

* * * * *